United States Patent
Chen

(10) Patent No.: US 9,525,814 B2
(45) Date of Patent: Dec. 20, 2016

(54) AUTOMATIC FOCUS SEARCHING USING FOCAL SWEEP TECHNIQUE

(71) Applicant: Himax Imaging Limited, Tainan (TW)

(72) Inventor: Po-Chang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 56 days.

(21) Appl. No.: 14/512,463

(22) Filed: Oct. 12, 2014

(65) Prior Publication Data

US 2016/0105599 A1   Apr. 14, 2016

(51) Int. Cl.
*G03B 13/00* (2006.01)
*H04N 5/232* (2006.01)

(52) U.S. Cl.
CPC .................. *H04N 5/23212* (2013.01)

(58) Field of Classification Search
CPC ............ G02B 7/365; G02B 7/38; G02B 7/28; H04N 5/23212; G03B 3/02; G03B 13/36; G03B 7/28; G06T 2207/10148; G06T 5/003; G06T 5/004
USPC ................................................. 348/345–356
See application file for complete search history.

(56) References Cited

U.S. PATENT DOCUMENTS

| | | | |
|---|---|---|---|
| 7,652,750 B2 * | 1/2010 | Opower | G03F 7/7005 355/55 |
| 2007/0091397 A1* | 4/2007 | Clube | G02B 26/108 359/17 |
| 2009/0047010 A1* | 2/2009 | Yoshida | G02B 7/36 396/127 |
| 2009/0284637 A1* | 11/2009 | Parulski | H04N 1/00183 348/333.12 |
| 2010/0026821 A1* | 2/2010 | Sato | G03B 5/00 348/208.99 |
| 2010/0080482 A1* | 4/2010 | Wong | H04N 5/23212 382/255 |
| 2010/0208091 A1* | 8/2010 | Chang | H04N 5/23219 348/222.1 |
| 2011/0221925 A1* | 9/2011 | Tajiri | G03B 9/08 348/222.1 |
| 2012/0120277 A1* | 5/2012 | Tsai | H04N 5/23293 348/223.1 |
| 2012/0200673 A1* | 8/2012 | Tagawa | G02B 7/365 348/46 |
| 2012/0281132 A1* | 11/2012 | Ogura | H04N 5/23212 348/348 |
| 2013/0028582 A1 | 1/2013 | Batur | |
| 2013/0113984 A1* | 5/2013 | Shimamoto | G03B 13/32 348/345 |

(Continued)

FOREIGN PATENT DOCUMENTS

| | | |
|---|---|---|
| CN | 103430058 A | 12/2013 |
| CN | 103477644 A | 12/2013 |
| TW | 201400964 A | 1/2014 |

*Primary Examiner* — Chia-Wei A Chen
(74) *Attorney, Agent, or Firm* — Winston Hsu; Scott Margo

(57) ABSTRACT

An automatic focus searching method for an image capture device is provided. The image capture device has a lens and an image sensor. The method includes: setting an exposure time of the image sensor; computing a focal sweep trajectory of the lens based on at least the exposure time; during the exposure time, moving the lens along the focal sweep trajectory while exposing the image sensor; reading out pixel data of the image sensor that is generated during the exposure time; and applying a filtering operation upon the pixel data to generate an output image.

8 Claims, 12 Drawing Sheets

(56) References Cited

U.S. PATENT DOCUMENTS

| | | | |
|---|---|---|---|
| 2013/0307933 A1 | 11/2013 | Znamenskiy | |
| 2013/0314586 A1* | 11/2013 | Shimamoto | G02B 7/38 348/348 |
| 2013/0342750 A1* | 12/2013 | Foote | H04N 5/3532 348/349 |
| 2014/0002606 A1* | 1/2014 | Blayvas | G02B 27/0075 348/46 |
| 2014/0009670 A1 | 1/2014 | Znamenskiy | |
| 2014/0184883 A1* | 7/2014 | Shimamoto | G03B 3/00 348/345 |
| 2014/0226914 A1* | 8/2014 | Mocanu | G06T 5/003 382/255 |
| 2015/0195449 A1* | 7/2015 | Ono | G02B 7/36 348/349 |
| 2015/0381878 A1* | 12/2015 | Mishima | H04N 5/23212 348/241 |

* cited by examiner

AUTOMATIC FOCUS SEARCHING USING FOCAL SWEEP TECHNIQUE

BACKGROUND OF THE INVENTION

1. Field of the Invention

The present invention relates to an image capture device, and more particularly, to an image capture device using focal sweep technique to facilitate an automatic focus searching procedure and a related method thereof.

2. Description of the Prior Art

Automatic focus searching (AF) techniques are commonly applied in cameras. A traditional automatic focus searching method for a camera is to control the lens to move in various lens positions and measure sharpness of an image with respect to each of the lens positions. When peak sharpness is found through the above focus searching operation, the camera will output an image based on the focus located at the lens position corresponding to the found peak sharpness. In the above method, the lens of the camera must be moved to an initial lens position to measure a first sharpness value with respect to the initial lens position, and is then moved to a next lens position to measure a second sharpness value, and so on. When measuring sharpness for a next lens position, the camera will expose pixels of the sensor and measure the sharpness only when the lens is already at the lens position and remains settled.

For each camera, it is desirable to have a fast automatic focus searching. However, even when the camera is operated at high frame rate, a waiting procedure is inevitable. It usually takes time for an automatic focus searching run normally composed of several stepping cycles of waiting for the lens to settle on a certain location, exposing the pixels of the sensor for a certain exposure time, reading out pixel data from the sensor, and calculating sharpness information of the readout pixel data before the optimal focus can be determined. That is, even if the image sensor can output frames at a high rate, the automatic focus searching is still relatively slow due to the stepping cycles.

Please refer to FIG. 1, which is a diagram showing timing sequence of procedures employed in a conventional automatic focus searching. FIG. 1 illustrates timing charts of frames, exposing commands, sharpness measurements, and voice coil motor (VCM) commands from top to bottom. Each exposing command is executed for a corresponding frame in advance. After exposure, pixel data are read out so that the camera can start to measure the sharpness information for the frame. The lens is required to move and converge to a target position before the sharpness is measured. For example, at the beginning of the frame i, a corresponding VCM command is issued to move/drive the lens. Suppose the lens can be settled in an interval of one frame, an exposing command will be issued at the end of the frame i such that the sensor is allowed to start exposure. Afterwards, the camera can thus measure the sharpness information from the readout pixel data of frame i+1. This waiting makes the entire automatic focus searching procedure even less efficient.

One of simplest method to shorten the time required by the automatic focus searching is to increase the output frame rate. A high output frame rate normally imposes constraint on affordable longest exposure time and thus reduces practical exposure time. However, for the high output frame rate in a low-lighted condition, it has to level up gain/ISO (International Standards Organization) sensitivity to maintain the brightness of the images, while the exposure time is short. Unfortunately, it also deteriorates the signal-to-noise ratio (SNR) of images. Hence, there is a need to provide a novel method for improving the conventional automatic focus searching procedure.

SUMMARY OF THE INVENTION

According to an embodiment of the present invention, an automatic focus searching method for an image capture device is provided. The image capture device has a lens and an image sensor. The method includes: setting an exposure time of the image sensor; computing a focal sweep trajectory of the lens based on at least the exposure time; during the exposure time, moving the lens along the focal sweep trajectory while exposing the image sensor; reading out pixel data of the image sensor that is generated during the exposure time; and applying a filtering operation upon the pixel data to generate an output image.

According to another embodiment of the present invention, an image capture device is provided. The image capture device includes a lens, an image sensor, an image signal processor (ISP) and a lens moving mechanism. The ISP includes an auto-exposure (AE) engine and an automatic focus searching (AF) engine. The AE engine is arranged for controlling the exposure of the image sensor. The AF engine is arranged for computing a focal sweep trajectory of the lens based on at least the exposure time. The lens moving mechanism is controllable by the AF engine to move the lens along the focal sweep trajectory. The AE engine simultaneously exposes the image sensor while the lens is moved along the focal sweep trajectory during the exposure time. During the exposure time, charges are generated and accumulated in pixels of the image sensor. Then, pixel data are read out from the pixels by measuring the accumulated charges of the pixels. The ISP applies a filtering operation upon the readout pixel data to generate an output image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Focal Sweep Technique

Figure 1:
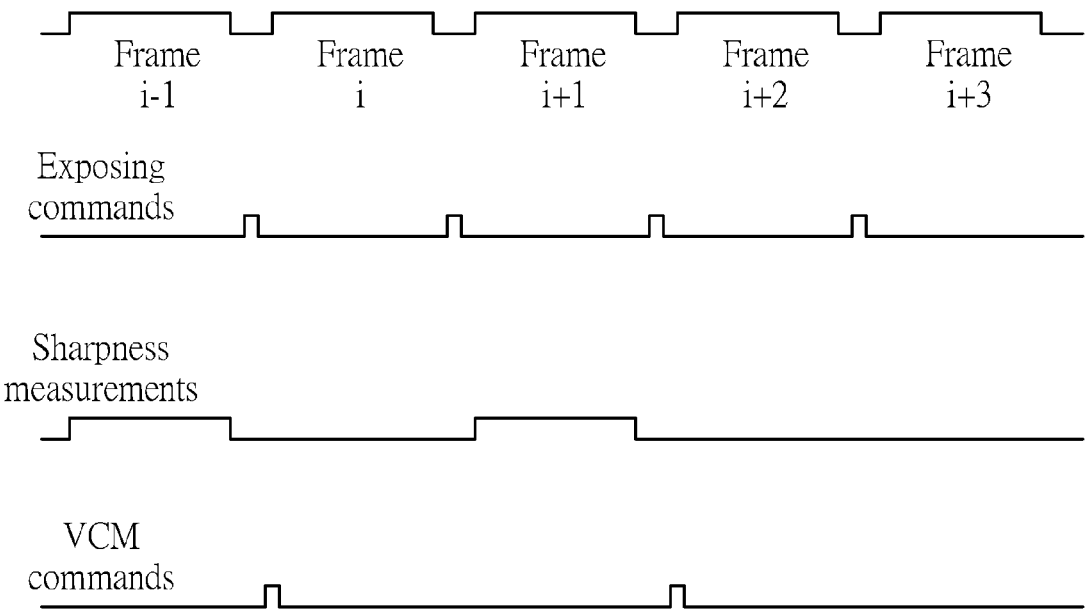
FIG. 1 is a diagram showing timing sequence of procedures employed in a conventional automatic focus searching of a camera.
Figure 2A:
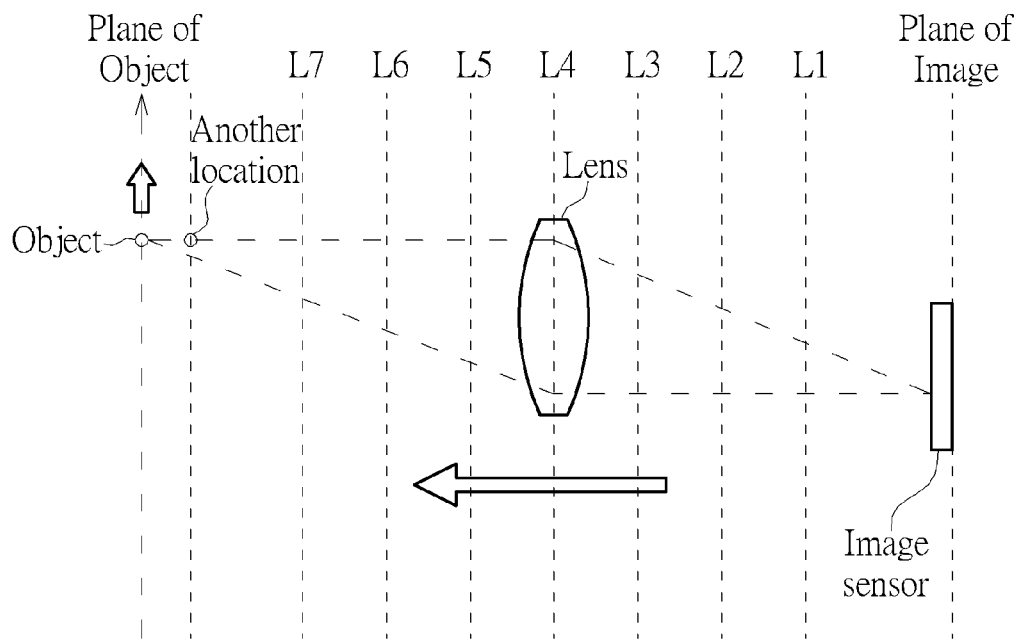
FIGS. 2A-2D illustrates a focal sweep technique.
Figure 2B:
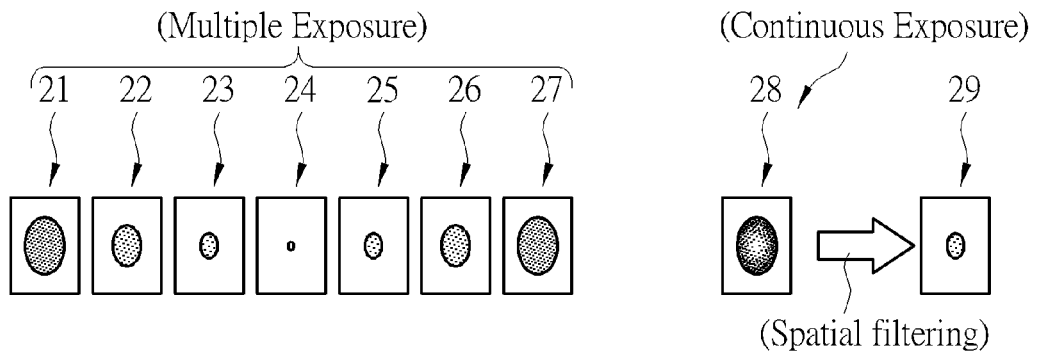

Please refer to FIGS. 2A-2D, which illustrates how a focal sweep technique uses in the present invention to facilitate an automatic focus searching procedure. FIG. 2A illustrates a lens, a corresponding sensor of a camera and an object to be captured by the camera. The lens is moved sequentially to different lens positions L1-L7, and each time the lens settles on a certain lens position, the sensor have pixels included thereof exposed for a predefined exposure time. After the predefined exposure time ends, the sensor stops exposing the pixels, and reads out pixel data respectively stored in the pixels to obtain an image. In this case, the object is assumed to remain settled. FIG. 2B illustrates images 21-27 obtained based on the lens positions L1-L7. As shown by FIG. 2B, in the images 21-24, a spot that is what the object is projected as on a plane of image (i.e., the sensor), gradually turns from a dim spot to a sharp spot. In the images 24-27, the spot gradually turns from a sharp spot to a dim spot. This means the object falls within a depth of view (DoF) of the camera when the lens is moved to the position L4. In the image 24, the spot is sharpest over all the other images. In other words, the lens position L4 is an optimal focus position/lens position to the object located at such distance from the sensor.

However, if the lens does not stop on the lens positions L1-L7 during the movement that the lens is continuously moved from the lens position L1 to the lens position L7, and the sensor have the pixels continuously exposed during the movement of lens, and pixel data is only read out after the lens reaches the lens position L7, an image 28 as shown in FIG. 2B can be obtained. The image 28 is much blurrier compared to the images 21-27 since the lens is moving while the pixels are being exposed.

Figure 2C:
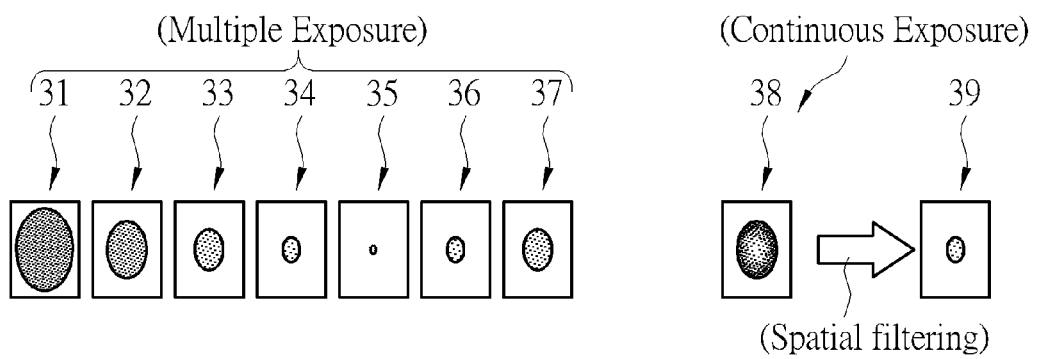
Figure 2D:
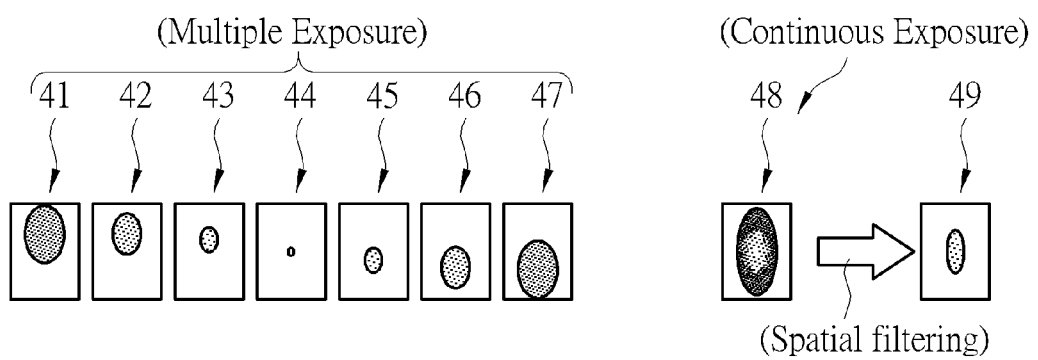

In another case, the object is assumed to be placed at another location that is closer to the sensor, and remain settled. The lens is still moved from the lens positions L1 to L7 and settles on each lens position, images 31-37 with respect to each lens position as shown in FIG. 2C are obtained by the manner that exposes pixels after lens settles. As the object is closer to the sensor, a sharp image 35 will be obtained with respect to the lens position L5 instead of the lens position L4. On the other hand, a blurry image 38 can be obtained by continuously exposing pixels while the lens is moving from the lens positions L1 to L7, and only reading out the pixel data after the lens reaches the lens position L7. In still another case, the object is assumed to move along a plane of object instead of being settled, and images 41-47 with respect to each lens position as shown in FIG. 2D can be obtained by the manner that exposes pixels after lens settles. As the object moves while being captured, the spot will be located in different positions of images 41-47. A blurry image 48 is still obtained by continuously exposing pixels while the lens is moving from the lens positions L1 to L7, and only reading out the pixel data after the lens reaches the lens position L7.

Although blurs in the images 21-27, 31-37 and 41-47 are quite different because of the movement of the object or different locations of the object with respect to the sensor, blurs in the images 28, 38 and 48 are quite similar, however. Hence, it is possible to recover the blurs due to different conditions using a same sharpness filter (i.e., spatial filter). The images 29, 39 and 49 that are obtained by applying the same spatial filtering operation upon the images 28, 38 and 48 as shown in figures. As can be seen from these filtered images, the spots are recovered clear.

As can be understood from the above-mentioned cases, if the lens has ever reached the optimal lens position (e.g. L4 or L5) that are an optimal focus point with respect to the object at certain distance, no matter whether the lens finally settles on the optimal lens position or the object remains settled while the pixels is being exposed, it is still possible to obtain a clear image by applying a spatial filtering upon the readout pixel data (generated by exposing the sensor and moving the lens simultaneously). Hence, it is possible to use such technique to replace the conventional automatic focus searching procedure. This is called focal sweep. Such technique has a strong immunity against the motion blur and effectively extends the DoF because objects at different distances in FIGS. 2B and 2C and object having movement in FIG. 2D can be clearly imaged after using the spatial filtering upon the readout pixel data. It is also feasible to use the focal sweep technique to combine with the traditional automatic focus searching method to improve the focus speed.

Image Capture Device

Based on the above-mentioned focal sweep technique, the present invention provides an image capture device for implementing the focal sweep technique. The image capture device first determines a focal sweep trajectory that a lens moves along. Accordingly, the image capture device allows an image sensor to be exposed continuously during movement of the lens. The image capture device reads out pixel data after the exposure, and applies a filtering operation to obtain an output image.

Figure 3A:
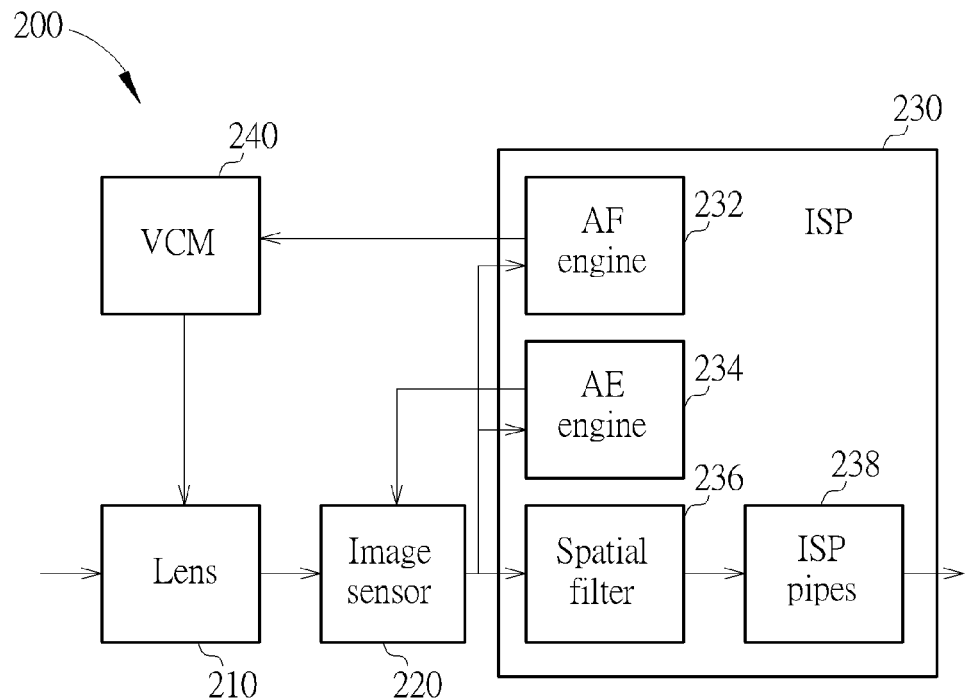
FIGS. 3A and 3B are diagrams illustrating an image capture device according to an embodiment of the present invention.
Figure 3B:
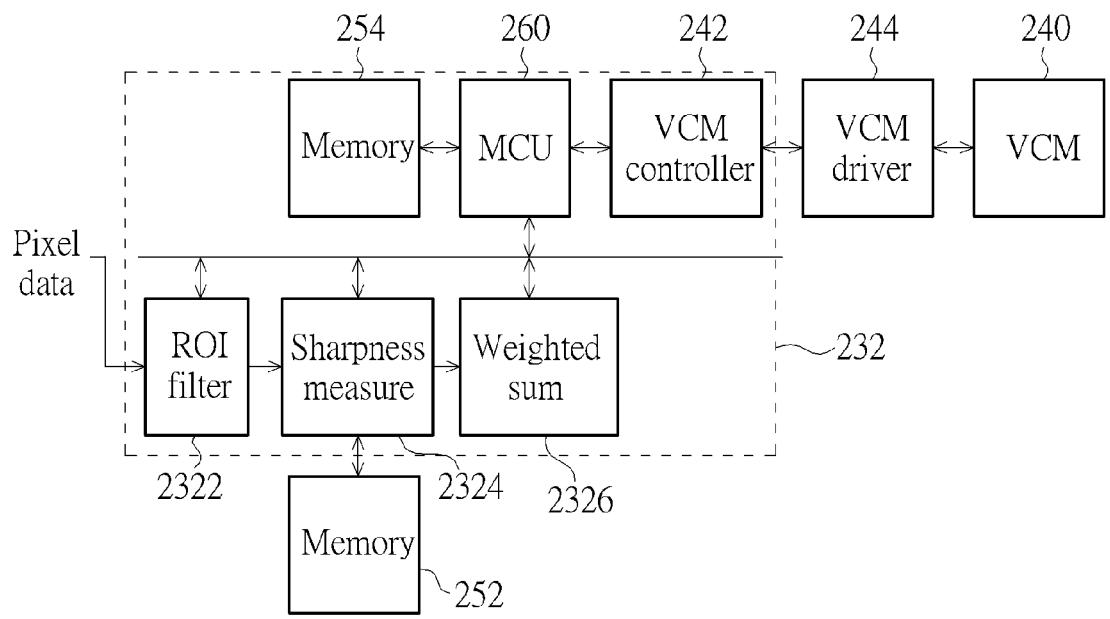

Please refer to FIGS. 3A and 3B, which illustrate an image capture device 200 and detailed architecture thereof according to an embodiment of the present invention. The image capture device 200 may be at least a portion (i.e. part or all) of an electronic device. For example, the image capture device 200 may be a digital camera. For another example, the image capture device 200 may be a camera module installed on a portable device such as a smartphone or a feature phone. The image capture device 200 includes (but not limited to) a lens 210, an image sensor 220, an image signal processor (ISP) 230 and a lens moving mechanism (e.g. a voice coil motor (VCM) 240). The ISP 230 is arranged for setting an exposure time for the image sensor 220 based on a light metering algorithm. The ISP 230 includes (but not limited to) an automatic focus searching (AF) engine 232, an auto-exposure (AE) engine 234, a spatial filter 236 and a plurality of ISP pipes 238. Please note that the ISP pipes 238 are optional and utilized for performing other signal processing operations and outputting images. For example, the ISP pipes 238 could perform de-noise operations or demosaicking operations upon the output image generated from the spatial filter 236 of the present invention.

In a preferred embodiment, the AF engine 232 is arranged for computing a focal sweep trajectory of the lens 210 based on at least the exposure time determined by the AE engine 234 in advance. Preferably, the operation of moving the lens 210 and the operation of exposing the image sensor 220 are substantially simultaneous. However, in various embodiments of the present invention, the duration of the exposure time could be identical to, or slightly longer or shorter than the duration of the movement of the lens 210. In addition, before the focal sweep is carried out, the AF engine 232 may collect some required sharpness information to determine the focal sweep trajectory.

Please refer to FIG. 3B, the AF engine 232 further comprises a region of interest (ROI) filter 2322 and a sharpness measurement unit 2324. The ROI filter 2322 picks up pixel data of interest from all the readout pixel data, and the sharpness measurement unit 2324 calculates sharpness information from the pixel data picked up by the ROI filter 2322. The AE engine 234 is arranged for allowing pixels of the image sensor 220 to be exposed while the lens 210 is moving along the focal sweep trajectory during an exposure time. The exposure time is determined by the AE engine 234 executing light metering algorithms, which could be spot metering, center-weighted average metering, partial metering, multi-zone metering, or highlight weighted metering.

The VCM 240 is controllable by the AF engine 232 to move the lens 210 to multiple lens positions, which covers from a farthest focus position to a nearest focus position. The AF engine 232 may determine a start position and an end position of the focal sweep trajectory by a micro-control unit (MCU) 260 comparing sharpness information calculated by the sharpness measurement unit 2324 or a predetermined rule (which will be illustrated later). The MCU 260 may read the sharpness values provided by the sharpness measurement unit 2324, and stores this information to the memory 254, and analyzes then to determine the start position and the end position. Accordingly, the MCU 260 transmits a command including the start position and the end position of the focal sweep trajectory to a VCM controller 242, and the VCM controller 242 according to the determined exposure time and the start and end position to determine how to control the VCM driver 244 to drive the VCM 240. Accordingly, the VCM can therefore move the lens along a determined trajectory.

The ROI filter 2322 is used to multiplex the input pixel data based on specified ROIs, and output the classified pixel data (belonging to different ROIs of an image, respectively) to the sharpness measuring unit 2324. The sharpness measuring unit 2324 is used to receive the pixel data of the ROIs respectively, buffer the data/streaming data into the memory 252 for mask calculation, and apply a sharpness calculation onto the buffered data for calculating the sharpness values of ROIs. If necessary, a weighted sum calculation unit 2326 is configured to receive the sharpness values of ROIs from the sharpness measuring unit 2324, and output a weighted sum based on a set of specified weight factors corresponding to different ROIs.

Readout Mechanism

Figure 4A:
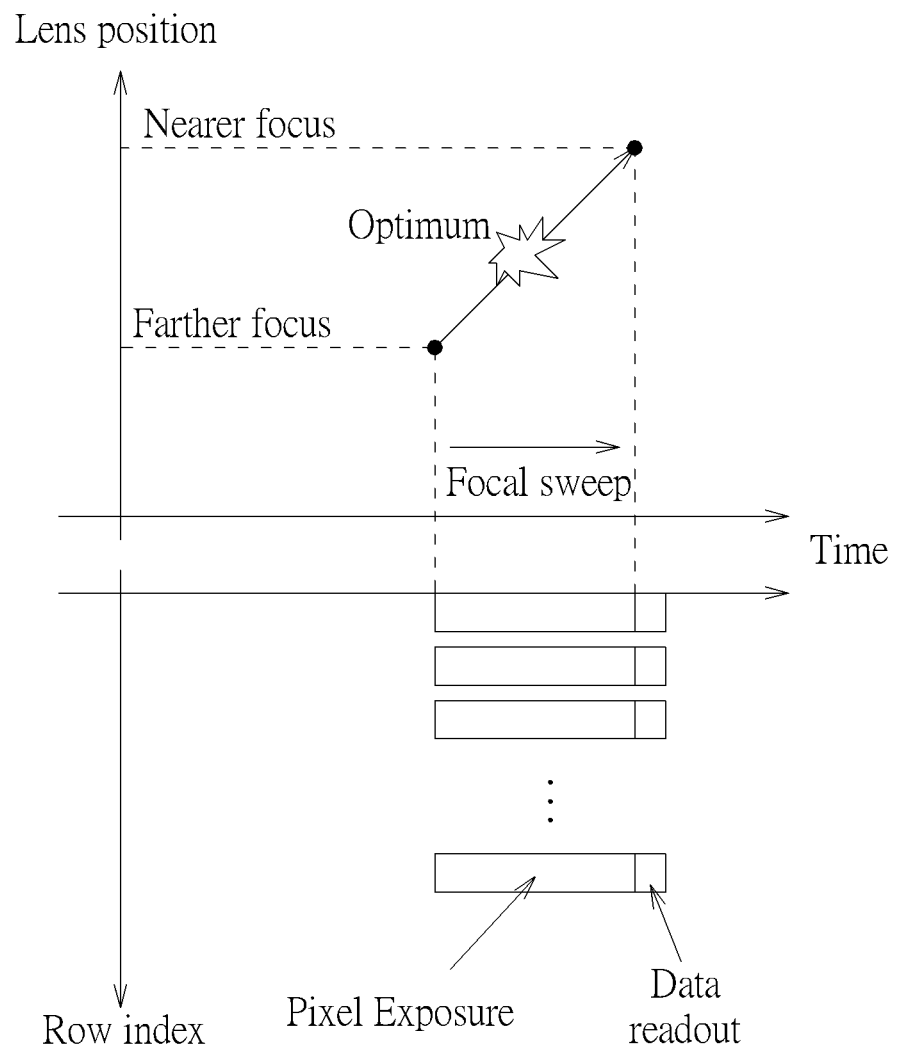
FIG. 4A and FIG. 4B illustrates different pixel data readout mechanisms of the present invention.
Figure 4B:
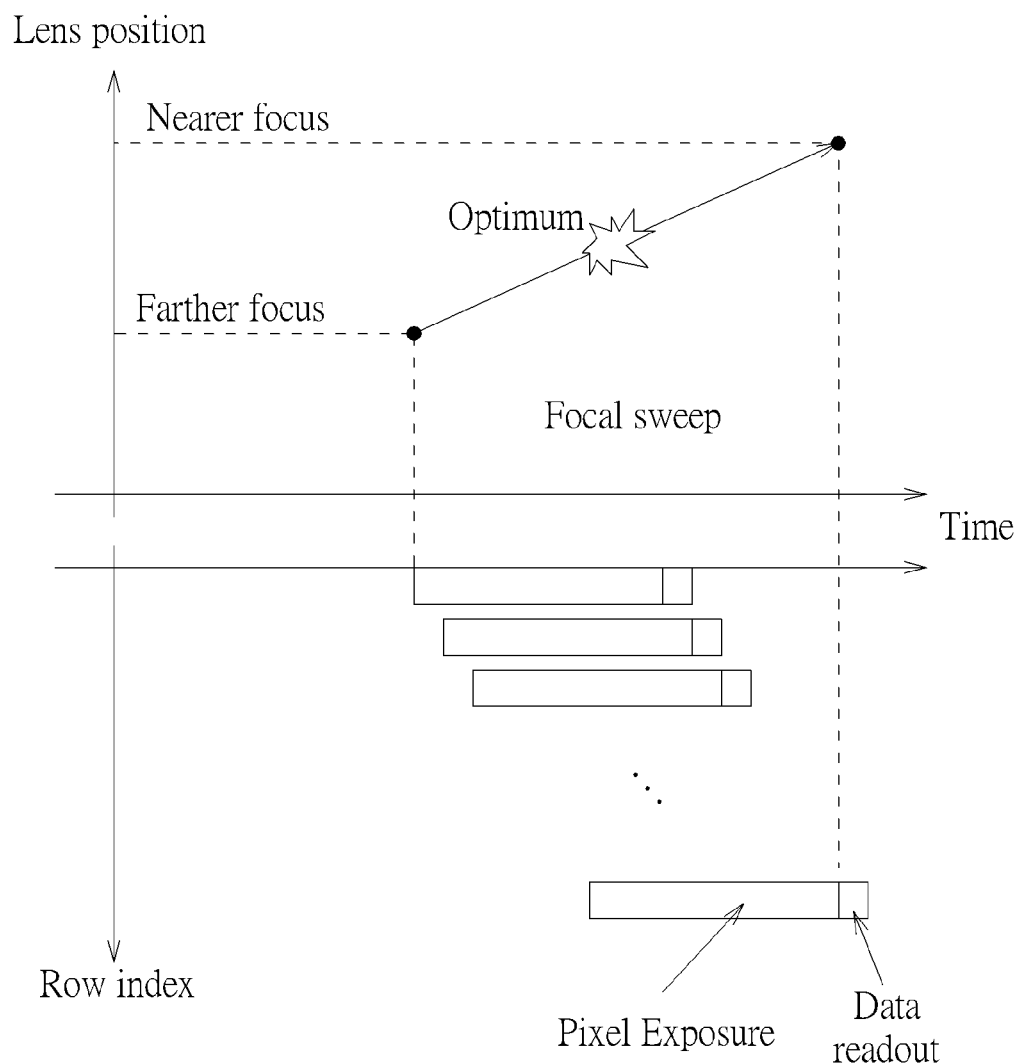

Assuming that the image sensor 220 has a global shutter readout mechanism, each row of pixels of the image sensor 220 are exposed simultaneously during the movement of the lens 210, and pixel data of each row of the pixels are read out at once (as shown by FIG. 4A). Under such readout mechanism, the movement of the lens 210 can start and end at any lens position. On the other hand, assuming that the image sensor 220 has a rolling shutter readout mechanism, each row of pixels of the image sensor 220 are exposed sequentially from a first row of pixels at top of the image sensor 220 to a last row of the pixels at bottom of the image sensor 220 during the movement of the lens 210, and pixel data are readout row by row (as shown by FIG. 4B). Under such readout mechanism, exposure sequence of each pixel row should be taken into the consideration of determining the movement of the lens. That is, in order to ensure that the lens 210 has reached/is close to an optimal lens position that is optimal to an object of interest to which certain rows of pixels that are being exposed correspond, the focal sweep trajectory has to be well planned. Otherwise, it is possible that when certain rows of pixels with respect to the object of interest are being exposed, the lens 210 has not reached or is not close to the optimal lens position. If this happens, the image capture device 200 hardly obtains a clear image even if the spatial filtering is applied upon the readout pixel. The rows of pixels "correspond to" the object of interest refers to the rows of pixels and the object of interest has similar locations in a view of image or the image sensor.

Command Sequence

Figure 5:
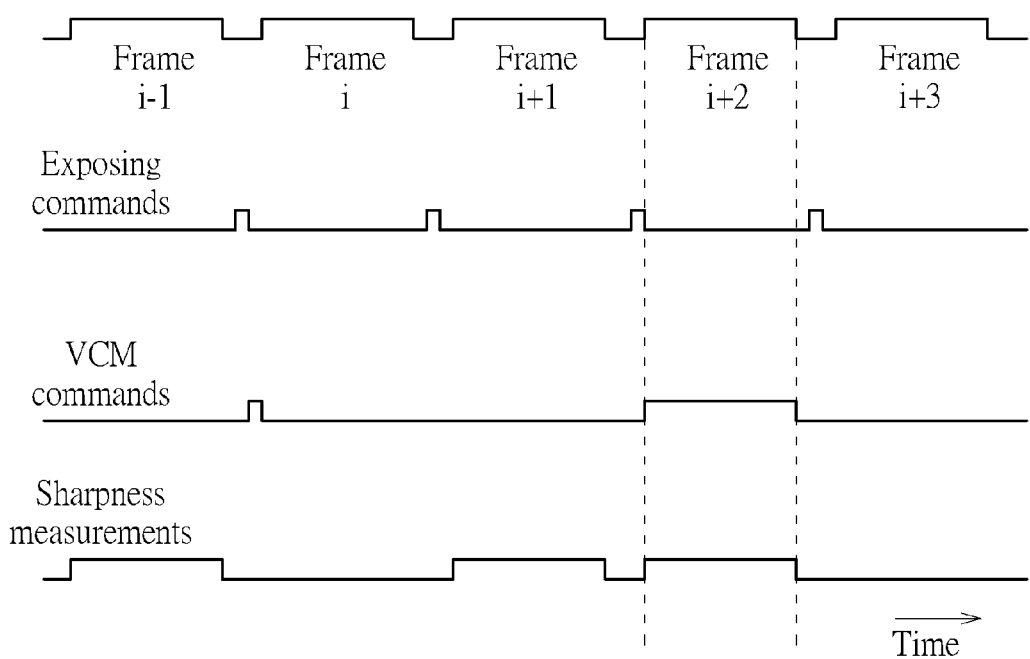
FIG. 5 illustrates a diagram showing timing sequence of procedures employed in an automatic focus searching of the present invention.

Please refer to FIG. 5, which is a timing diagram showing the procedures employed by an automatic focus searching function of the image capture device 20 according to an embodiment of the present invention. As shown in FIG. 5, the sequences of frames, exposing commands, VCM commands and sharpness measurements are sequentially shown from top to bottom. Each exposing command is executed for a corresponding frame in advance, so that the image capture device 200 can start to measure the sharpness for the frame. At the beginning of the frame i+2, the exposing command corresponding to the frame i+2 is issued. The exposure operation will be carried out continuously in the interval entire frame i+2. Meanwhile, the VCM command is simultaneously executed to continuously move the lens 210 along the focal sweep trajectory set by the AF engine 232, so that the lens 210 will be continuously moved in the entire frame i+2 where the exposure is carried out. As long as pixel data is read out, the sharpness measurement can be immediately performed. Under the rolling shutter readout mechanism, the pixel data are read out row by row, and therefore the sharpness measurement can be also performed on row-by-row basis.

Figure 6:
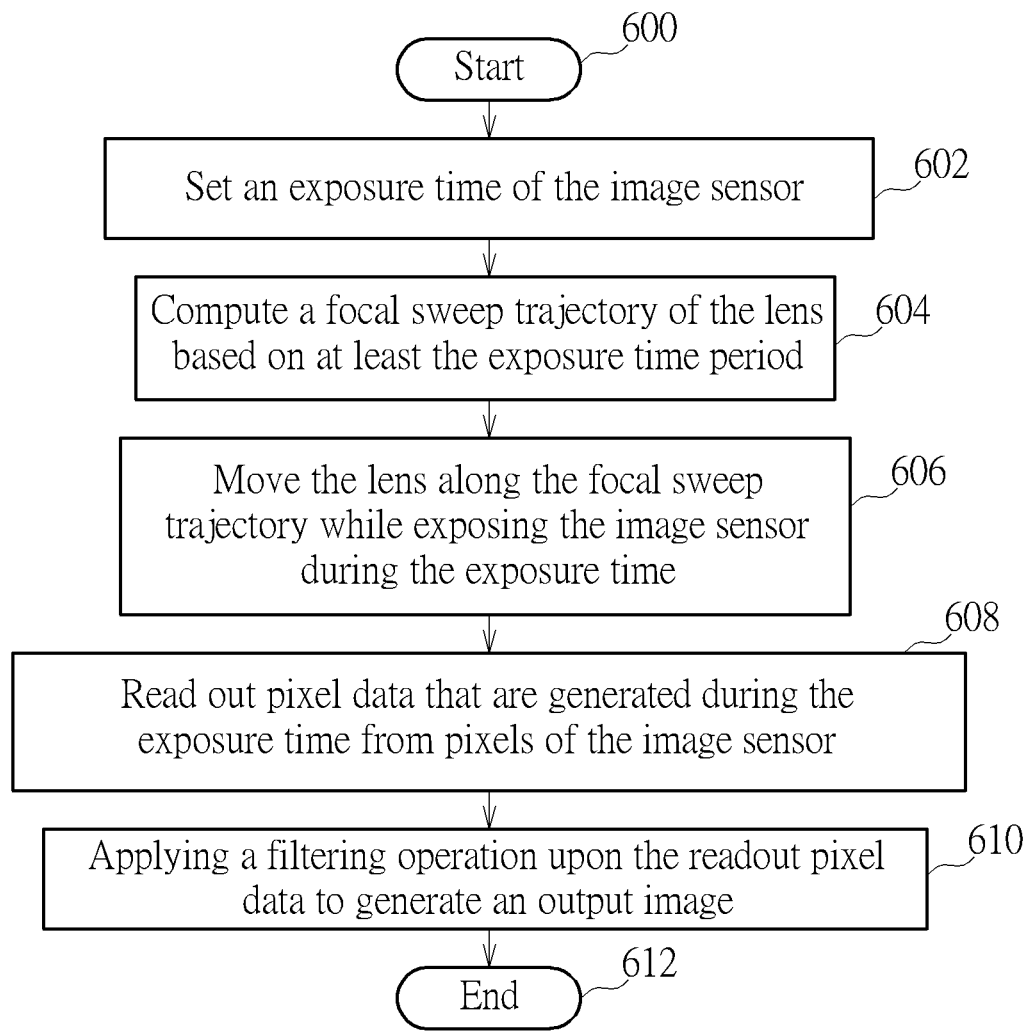
FIG. 6 is a flowchart illustrating an automatic focus searching method according to one embodiment of the present invention.

Please refer to FIG. 6, which is a flowchart illustrating an automatic focus searching method based on the above-mentioned focal sweep technique according to an embodiment of the present invention. Provided that the result is substantially the same, the steps are not required to be executed in the exact order shown in FIG. 6. The exemplary method may be employed by the image capture device 200 shown in FIG. 2, and can be briefly summarized by the following steps.

Step 600: Start.

Step 602: Set an exposure time of the image sensor.

Step 604: Compute a focal sweep trajectory of the lens based on at least the exposure time period.

Step 606: Expose the image sensor while moving the lens along the focal sweep trajectory during the exposure time.

Step 608: Read out pixel data that are generated during the exposure time from pixels of the image sensor.

Step 610: Applying a filtering operation upon the readout pixel data to generate an output image.

Step 612: End.

As a person skilled in the art can readily understand details of each step shown in FIG. 6 after reading the above paragraphs directed to the image capture device 200 shown in FIG. 2, further description is omitted here for brevity.

Focal Sweep Trajectory

As mentioned above, the image sensor 220 may be operated with different readout mechanisms. When the image sensor 220 is operated with a rolling shutter readout mechanism, the computing of the focal sweep trajectory of the lens 210 is quite critical, especially in a scene having multiple objects of interest. It is important to ensure that the lens has reached/is close to the optimal lens position to the object of interest when the rows of pixel corresponding to the object of interest are being exposed. In the following, there are illustrated several methods of computing the focal sweep trajectory to ensure a clear image can be obtained after the spatial filtering.

a. Fixed Trajectory

A first method of computing the move trajectory is to put the lens 210 to a farther focus position at the start of the movement, and put the lens 210 in a nearer focus position at the end of the movement. This is because of photocompositions that users are accustomed to. In a commonly used photocomposition, objects in an upper part of an image are usually farther from the image sensor (or user), while objects in a lower part of the image are usually nearer to the image sensor (or user). In addition, exposure of rows of pixels corresponding to the upper part of the image is prior to exposure of rows of pixels corresponding to the lower part under the roller shutter readout mechanism. Therefore, if the lens 210 moves from a farther focus position to a nearer focus position, it is very likely to have the lens 210 pass through an optimal focus position of each objects at different distances while exposing corresponding rows of pixels. Hence, as long as objects in a scene are composited as mentioned above, such way can ensure that a clear image can be obtained after the spatial filtering.

b. ROI-Based Searching

Since a distance between the farthest focus position and the nearest focus position of the lens may be very long, it is unrealistic to have the focal sweep trajectory to move the lens to every possible lens positions. Long focal sweep range may be impractical or infeasible concerning user operations and applications. Hence, it is necessary to restrict the focal sweep range. A ROI-based focus searching method which can effectively shorten the focal sweep range is presented as below.

Figure 7A:
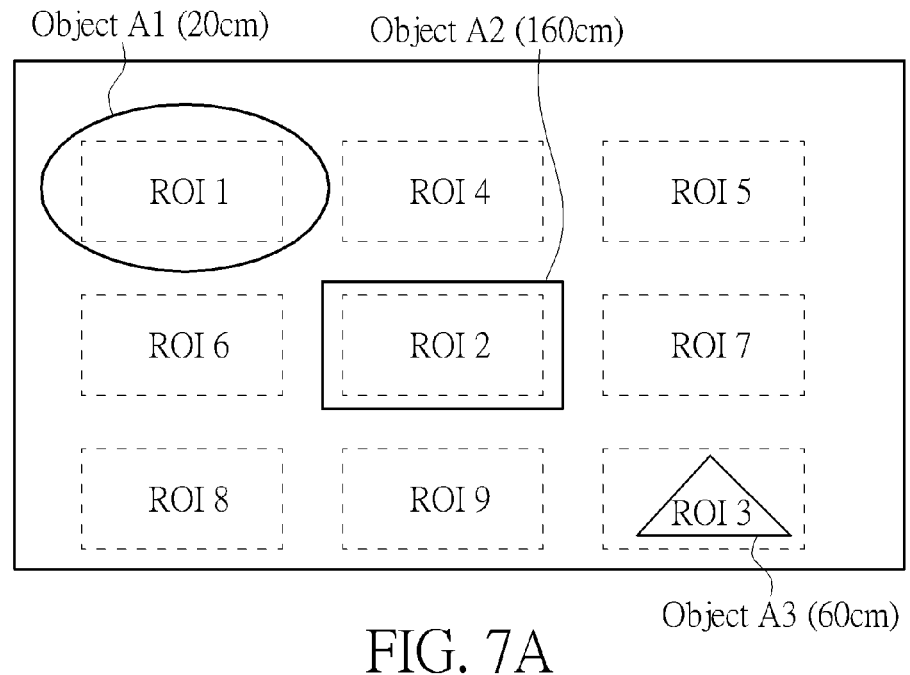
FIGS. 7A-7D illustrate a ROI-based searching method used in the automatic focus searching according to one embodiment of the present invention.

Please refer to FIG. 7A, which illustrates a scene including three objects A1-A3. The object A1 is 20 cm from the image capture device 200, the object A2 is 160 cm away from the image capture device 200, and the object A3 is 60 cm from the image capture device 200. The ROI-based searching method provides a plurality of predefined ROIs. A possible configuration of predefined ROIs 1-9 is also marked on the drawing according to their relative positions. Please note that, the number of the predefined ROIs and locations of the predefined illustrated by FIG. 7A should not be considered as a limitation of the present invention.

In the ROI-based searching method, the AF engine 232 first conducts a peak sharpness searching operation. During this operation, the VCM controller 242 instructs the VCM 240 to move the lens 210 along a peak sharpness searching trajectory that may be from a farther focus position to a nearer focus position. Readout pixel data during the peak sharpness searching operation is sent to ROI filter 2322 to classify the readout pixel data (i.e., belonging to which of ROI), and then the sharpness measurement unit 2324 calculates sharpness information of the classified pixel data that is buffered in the memory 252. When all the pixel data is read out and sent to the AF engine 232, sharpness values respectively corresponding to ROIs 1-9 at a certain lens position can be obtained. The MCU 260 stores the sharpness values into the memory 254. Till the movement of the lens 210 in the peak sharpness searching operation finishes, the MCU 260 has stored sharpness values of ROIs 1-9 with respect to each lens position into the memory 254. Accordingly, the MCU 260 determines a focal sweep range according the stored sharpness values.

Figure 7B:
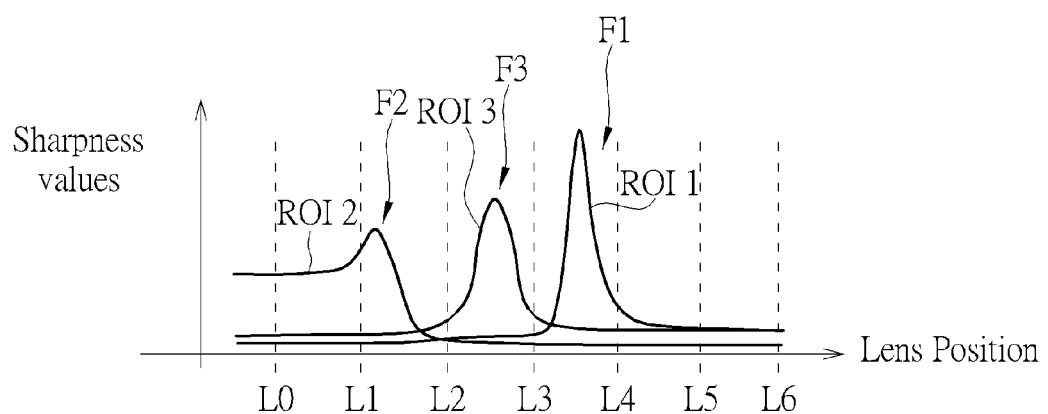

FIG. 7B illustrates sharpness values corresponding to ROIs 1-3 when the lens 210 moves from lens position L0-L6. Sharpness values corresponding to other ROIs are omitted here because there is no object of interest located within ranges of these ROIs. As can be seen from FIG. 7B, between the lens positions L1 and L2, the sharpness value corresponding to the ROI 2 has a peak F2; between the lens positions L2 and L3, the sharpness value corresponding to the ROI 3 has a peak F3; and between the lens positions L3 and L4, the sharpness value corresponding to the ROI 1 has a peak F1. The lens positions at which the peak sharpness values correspond to can be used to determine the focal sweep trajectory later.

After the peak sharpness value of each predefined ROI has been found, according to user's selection, one or more of the predefined ROIs 1-9 will be determined as a target ROI. That is, this method allows the user to arbitrarily select one or more objects A1, A2 and A3 to be focused through a user interface provided by the image capture device. In this way, one or more ROI associated with the selected object will be determined as targeted.

Figure 7C:
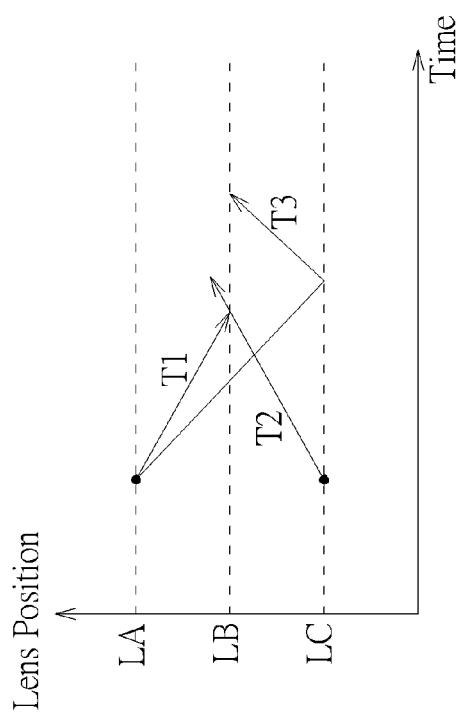

Please refer to FIG. 7C. When the user selects to focus on the objects A1 and A3, the ROI 1 and ROI 3 are targeted, and therefore the AF engine 232 will set an optimal lens position LA for the ROI 1 and an optimal lens position LB for the ROI 3 as the start position and the end position of the focal sweep trajectory. Under the global shutter readout mechanism, both of lens position LA and the lens position LB can be the start or the end position of the focal sweep trajectory. However, under the rolling shutter mechanism, because pixels corresponding to ROI 1 are exposed before pixels corresponding to ROI 3 are exposed, the start position will be preferably the lens position LA that is optimal to the ROI 1 and the end position will be preferably the lens position LB that is optimal to the ROI 3 (i.e., trajectory T1). In such case, the lens 210 is actually moved from a nearer focus position (LA) to a farther focus position (LB), which is different from the rule used in the fixed trajectory. Similarly, when the ROI 2 and ROI 3 are targeted (meaning that the user intends to focus on the objects A2 and A3), the focal sweep trajectory of lens 210 could look like trajectory T2, which has a start position LC that is optimal to the ROI 2 and an end position LB that is optimal to the object A3 (under rolling shutter readout mechanism). However, if under the global shutter readout mechanism, the end position and the start position of the trajectory T2 will be interchangeable. When all of the ROIs are targeted, the focal sweep trajectory of lens 210 could look like trajectory T3, which has a start position LA that is optimal to the ROI 1, an intermediate position LC that is optimal to the ROI 2, and an end position LB that is optimal to the ROI 3 (under the rolling shutter readout mechanism). In the case of all the ROIs being targeted, the lens 210 is first moved from a nearer focus position (LA) to a farther focus position (LC), and then moved from a farther focus position (LC) to a nearer focus position (LB).

The optimal lens positions LA, LB, LC could be determined according to the measured sharpness value with respect to the lens position as shown by FIG. 7B. For example, the lens position LA that is optimal to the ROI 1 could be determined to be close to the lens positions L1 and L2 which the peak sharpness value F2 of ROI 1 corresponds to. Similar, the lens position LB that is optimal to the ROI 3 could be determined to be close to the lens positions L2 and L3 which the peak sharpness value F3 of ROI 3 corresponds to; the lens position LC that is optimal to the ROI 2 could be determined to be close to the lens positions L3 and L4 which the peak sharpness value F1 of ROI 2 corresponds to.

Figure 7D:
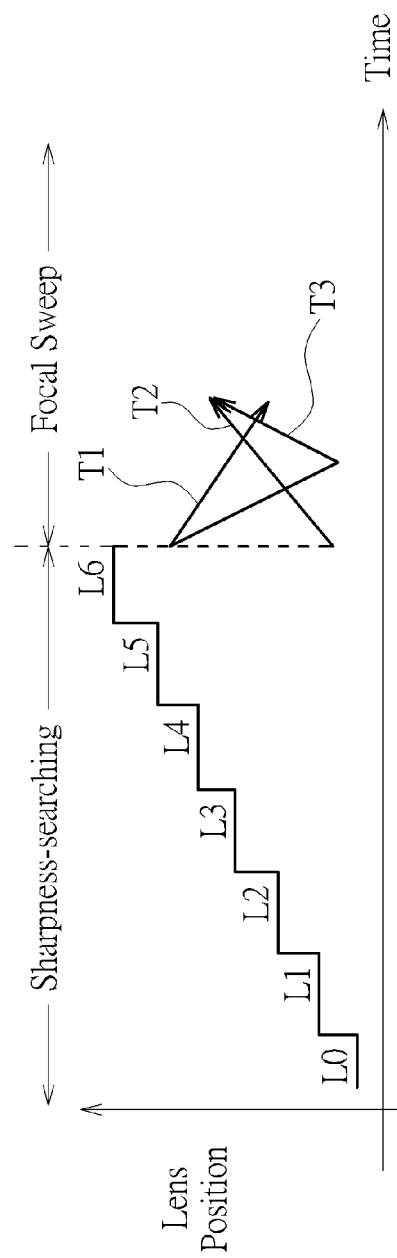

FIG. 7D illustrates movement of the lens 210 according to a combination of the peak sharpness searching operation and the focal sweep technique. As shown by FIG. 7D, each time the lens 210 is driven to lens positions L0 to L6, the lens 210 settles for a while. This is intended to collect pixel data for calculating the sharpness values corresponding to each ROI. After the sharpness values corresponding to each ROI have been calculated among different lens positions, the focal sweep trajectory can be therefore determined to perform focal sweep. Please note that the step sizes between each two adjacent positions of L0-L7 can be the same or different even though they are illustrated the same in the drawing.

Figure 8:
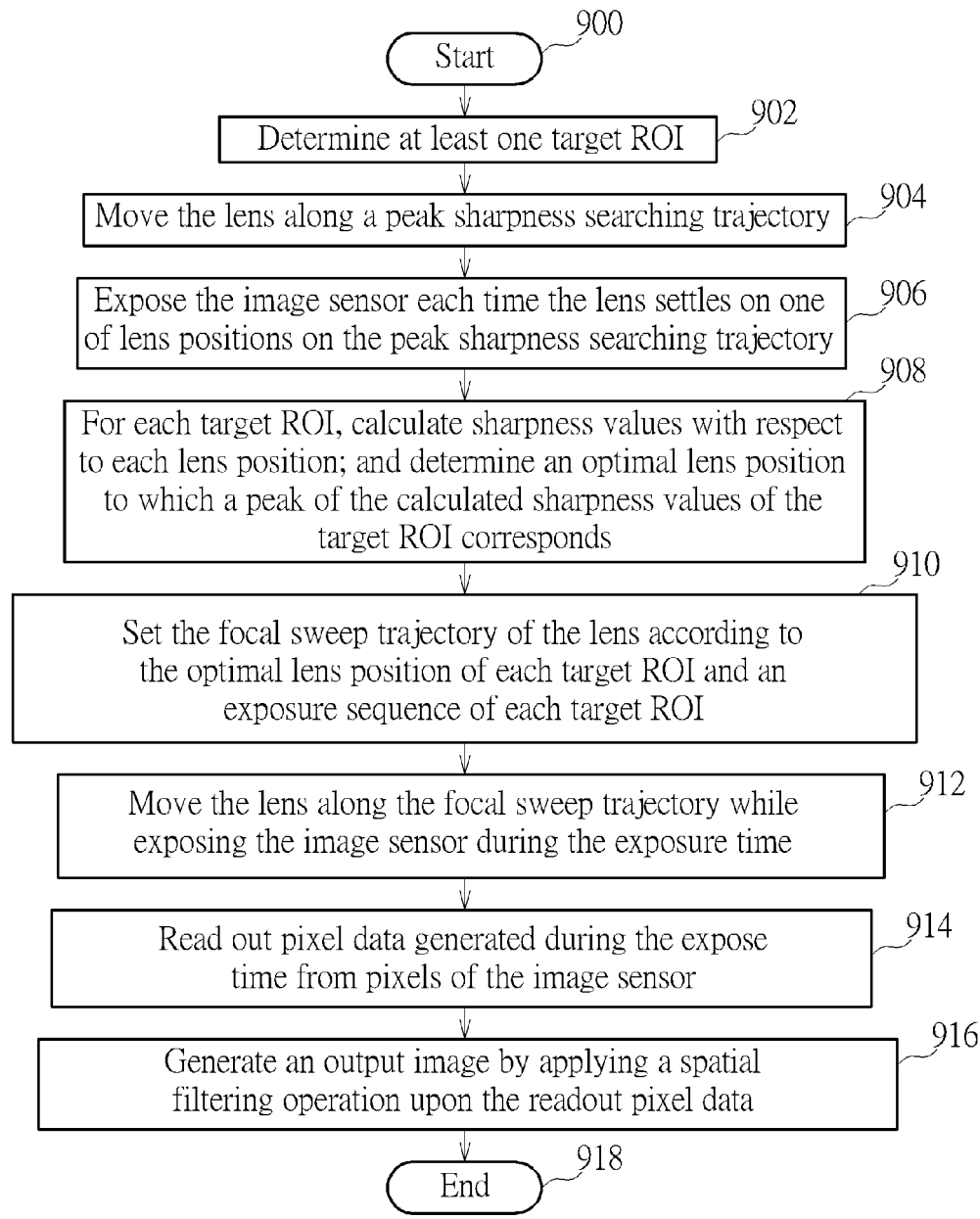
FIG. 8 is a flowchart illustrating the ROI-based searching method according to the embodiment shown by FIGS. 7A-7D.

Please refer to FIG. 8, which is a flowchart illustrating an automatic focus searching method according to the embodiment shown in FIGS. 7A-7D of the present invention. Provided that the result is substantially the same, the steps are not required to be executed in the exact order shown in FIG. 8. The exemplary method may be employed by the image capture device 200 shown in FIG. 2, and can be briefly summarized by the following steps.

Step 900: Start.
Step 902: Determine at least one target ROI.
Step 904: Move the lens along a peak sharpness searching trajectory.
Step 906: Expose the image sensor each time the lens settles on one of lens positions on the peak sharpness searching trajectory.
Step 908: For each target ROI, calculate sharpness values with respect to each lens position; and determine an optimal lens position to which a peak of the calculated sharpness values of the target ROI corresponds.
Step 910: Set the focal sweep trajectory of the lens according to the optimal lens position of each target ROI and an exposure sequence of each target ROI.
Step 912: Move the lens along the focal sweep trajectory while exposing the image sensor during the exposure time.
Step 914: Readout pixel data generated during the expose time from pixels of the image sensor.
Step 916: Generate an output image by applying a spatial filtering operation upon the readout pixel data.
Step 918: End.

As a person skilled in the art can readily understand details of each step shown in FIG. 8 after reading the above paragraphs corresponding to FIGS. 7A-7D, further description is omitted here for brevity.

c. Two-Stage Searching

Figure 9A:
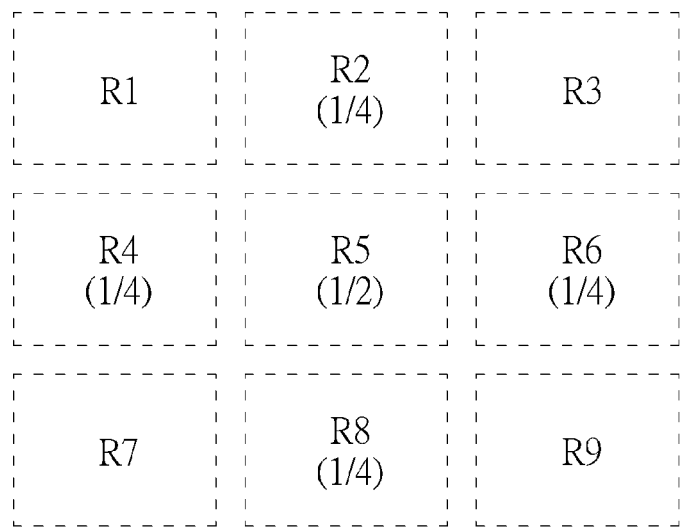
FIGS. 9A and 9B illustrate a two stage searching method used in the automatic focus searching according to one embodiment of the present invention.

Another method to shorten the focal sweep range is to combine the focal sweep technique with a coarse searching stage. Please refer to FIG. 9A and FIG. 9B. FIG. 9A illustrates a possible configuration of predefined ROIs R1-R9. Please note that the number of the predefined ROIs and locations of the predefined illustrated by FIG. 9A should not be considered as a limitation of the present invention.

In this method, the target ROI is predetermined, and a target sharpness value of the target ROI will be calculated according to sharpness value of the target ROI and sharpness values of the other ROIs that are adjacent to the target ROI. For example, in FIG. 9A, the target ROI is R5, and there are ROIs R2, R4, R6 and R8 that are adjacent to the target ROI R5. However, this is not a limitation. According to various embodiments of the preset invention, the target ROI could be any another ROI. For example, when the target ROI is R6, the adjacent ROIs are R3, R5 and R9.

The sharpness value of the target ROI R5 could be obtained by the ROI filter 2322 picking up associated pixel data from the readout pixel data, and the sharpness measurement unit 2324 calculates the sharpness value of the target ROI R5 according to the pixel data picked up by the ROI filter 2322. In the same manner, the sharpness values of ROIs R2, R4, R6 and R8 can be also obtained. The weighted sum calculation unit 2326 calculates a target sharpness value for the target ROI R5 according to sharpness values of ROIs R2, R4, R5, R6 and R8 and their respective weight factors. Instead of being a limitation, the weight factors of these ROIs are assumed to be ¼, ¼, ½, ¼ and ¼. The target sharpness value is calculated while the VCM controller 242 instructs the VCM 240 to move the lens 210 to multiple lens positions during the coarse searching stage.

Figure 9B:
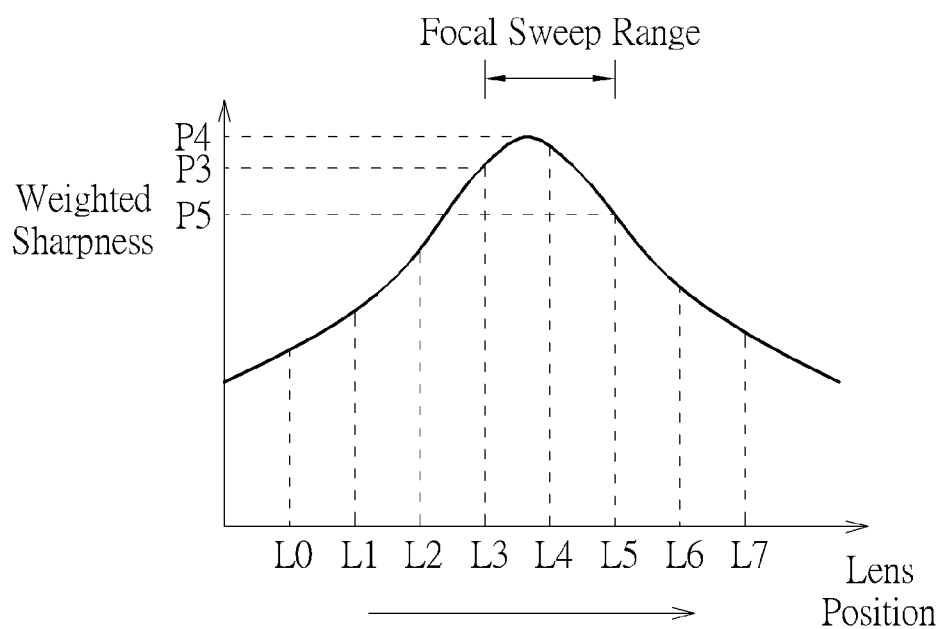

Please refer to FIG. 9B. During the coarse searching stage, the lens 210 is intended to be moved from the lens position L0 toward the lens position L7. Please note that distances between neighboring lens positions may be identical or different, and may be larger than the distance between neighboring lens position in the ROI-based searching method (since this is intended for a coarse search). The following is an example. When the lens settles on the lens position L3, the AF engine 232 could obtain a target sharpness value P3. Afterwards, the AF engine 232 calculates a target sharpness value P4 with respect to a lens position L4. It is detected by the AF engine 232 that the target sharpness value P4 with respect to lens position L4 is larger than the target sharpness value P3 with respect to lens position L3. Hence, the AF engine 232 issues a command to instruct the VCM controller 242 to keep driving the lens 210 along the same direction (i.e., from L0 to L7). Accordingly, the AF engine 232 calculates a target sharpness value P5 with respect to a lens position L5 when the lens 210 settles on the lens position L5. However, it is detected that the target sharpness value P5 is smaller than the previously-detected target sharpness value P4. Therefore, the AF engine 233 finishes the coarse searching stage, and initiates a focal sweep searching stage. A trajectory of the focal sweep searching stage will at least cover a range between the lens positions L3 and L5. For example, the focal sweep trajectory of the lens 210 could be from a start position at lens position L5 to an end position at lens position L3. However, it is also possible to start the focal sweep at the lens position L3 and ends it at the lens position L5. Alternatively, the start position and the end position may be not exactly to the lens positions L3 and L5. It is possible to have the start position close to the lens position L3 while have the end position close to the lens position L5, or vice versa. Once the focal sweep trajectory is determined, the AF engine 232 sets the start and end positions to the VCM controller 242. The VCM controller 242 controls the VCM driver 244 according to the start and end positions and the exposure time set by the AE engine 234. After the exposure time ends, the pixel data is read out from the image sensor 210, and the spatial filter 236 filters the readout pixel data to generate the output image.

Figure 10:
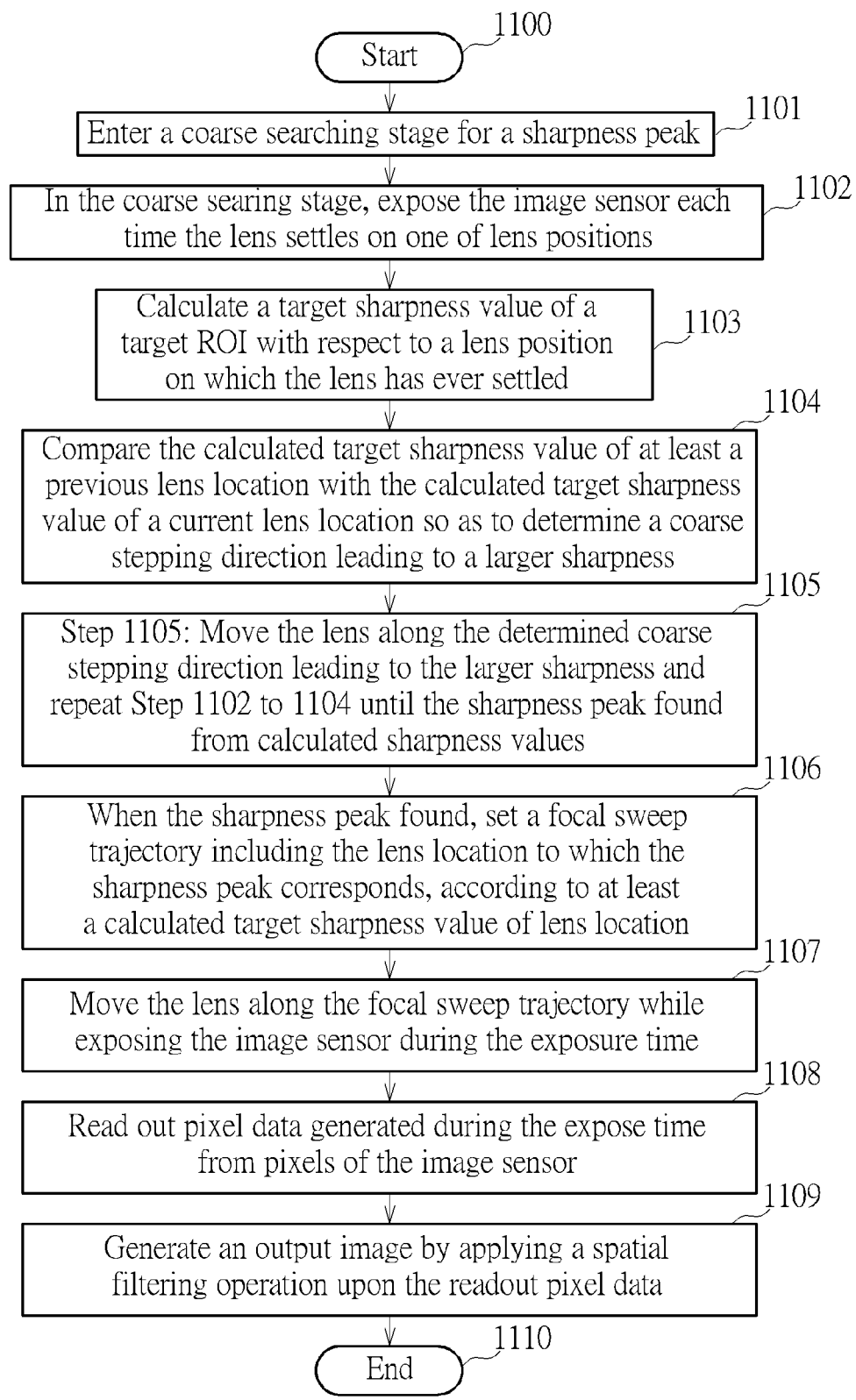
FIG. 10 is a flowchart illustrating the two stage searching method according to the embodiment shown by FIGS. 9A-9B.

Please refer to FIG. 10, which is a flowchart illustrating an automatic focus searching method according to the embodiment shown in FIGS. 9A and 9B of the present invention. Provided that the result is substantially the same, the steps are not required to be executed in the exact order shown in FIG. 10. The exemplary method may be employed by the image capture device 200 shown in FIG. 2, and can be briefly summarized by the following steps.

Step 1100: Start.

Step 1101: Enter a coarse searching stage for a sharpness peak.

Step 1102: In the coarse searing stage, expose the image sensor each time the lens settles on one of lens positions.

Step 1103: Calculate a target sharpness value of a target ROI with respect to a lens position on which the lens has ever settled.

Step 1104: Compare the calculated target sharpness value of at least a previous lens location with the calculated target sharpness value of a current lens location so as to determine a coarse stepping direction leading to a larger sharpness.

Step 1105: Move the lens along the determined coarse stepping direction leading to the larger sharpness and repeat Step 1102 to 1104 until the sharpness peak found from calculated sharpness values.

Step 1106: When the sharpness peak found, set a focal sweep trajectory including the lens location to which the sharpness peak corresponds, according to at least a calculated target sharpness value of lens location.

Step 1107: Move the lens along the focal sweep trajectory while exposing the image sensor during the exposure time.

Step 1108: Read out pixel data generated during the expose time from pixels of the image sensor.

Step 1109: Generate an output image by applying a spatial filtering operation upon the readout pixel data.

Step 1110: End.

Extending DoF

The focal sweep technique has an advantage of extending DoF of the image capture device. As can be known from the above description, once the focal sweep trajectory includes an optimal focus position of a certain object, a clear image of the object can be obtained by the spatial filtering operation. Hence, even if a scene having multiple objects of interest, each having a different distance from the image capture device, clearly imaged multiple objects can be obtained in a single output image as long as the focal sweep trajectory of lens includes the optimal lens position for each object of interest and the spatial filtering is applied. This is still effective even if a distance between the farthest object of interest and the nearest object of interest exceeds the DoF generally determined by the lens of the image capture device. In other words, the DoF of the image capture device is substantially extended.

CONCLUSION

In addition to extending the DoF, the present invention is capable of speeding up the automatic focus searching operation. This is because the present invention does not need to wait the lens to settle, several times of exposure, and several times of measuring the sharpness. Long exposure time is also acceptable to the present invention because the motion blur effect due to object movement and/or handshake of the user can be suppressed by the proposed focus sweep imaging method and the spatial filter. In addition, as the present invention uses focal sweep to replace the traditional focus searching method using images generated by several times of exposure to search the focus, the time required by the present invention to search the focus will not increase along with the long exposure time. Hence, the present invention can level down the gain/ISO of the image sensor to assure the image quality.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

An embodiment of the invention may include functionality that may be implemented as software executed by a processor, hardware circuits or structures, or a combination of both. The processor may be a general-purpose or dedicated processor. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic focus searching method for an image capture device, the image capture device having a lens and an image sensor having a rolling shutter readout mechanism, the method comprising:

setting an exposure time of the image sensor;

computing a focal sweep trajectory of the lens based on at least the exposure time;

during the exposure time, moving the lens along the focal sweep trajectory while exposing the image sensor;

reading out pixel data of the image sensor that is generated during the exposure time; and applying a filtering operation upon the pixel data to generate an output image;

wherein the step of computing the focal sweep trajectory of the lens comprises:

providing a plurality of regions of interest (ROIs) corresponding to the output image;

determining at least one target ROI from the ROIs according to a user input selection; and determining an optimal lens position corresponding to each target ROI; and computing the focal sweep trajectory according to an exposure sequence corresponding to each target ROI and the optimal lens position corresponding to each target ROI;

wherein the plurality of ROIs include a first target ROI and a second target ROI, a first exposure sequence corresponding to the first target ROI is prior to a second exposure sequence corresponding to the second target ROI, and the step of computing the focal sweep trajectory of the lens comprises:

setting the focal sweep trajectory of the lens to have a start position that is close to a first optimal lens position corresponding to the first target ROI; and an end position that is close to the second optimal lens position corresponding to the second target ROI; and setting the start position to correspond to a start time of the exposure time and the end position to correspond to an end time of the exposure time wherein first pixels of the image sensor corresponding to the first ROI are exposed before second pixels of the image sensor corresponding to the second ROI are exposed.

2. The automatic focus searching method of claim 1, wherein the filtering operation includes a spatial filtering operation.

3. The automatic focus searching method of claim 1, wherein the step of computing the focal sweep trajectory of the lens further comprises:

setting the focal sweep trajectory of the lens to have the start position corresponding to a far focus and the end position corresponding to a near focus; and setting the start position to correspond to the start time of the exposure time and the end position to correspond to the end time of the exposure time.

4. The automatic focus searching method of claim 1, wherein the step of determining the optimal lens position corresponding to each target ROI comprises:

with respect to each target ROI:

moving the lens along a peak sharpness searching trajectory including a plurality of peak sharpness searching lens positions;

calculating sharpness values of the target ROI respectively corresponding to the peak sharpness searching lens positions;

determining a peak sharpness value from the calculated sharpness values; and determining a specific peak sharpness searching lens position which corresponds to the peak sharpness value as the optimal lens position.

5. An image capture device, comprising:

a lens;

an image sensor having a rolling shutter readout mechanism;

an image signal processor (ISP), comprising:

an automatic focus searching (AF) engine, arranged for computing a focal sweep trajectory of the lens based on at least the exposure time; and an auto-exposure (AE) engine, arranged for exposing the image sensor, wherein the lens is moved along the focal sweep trajectory while exposing the image sensor during the exposure time; and a lens moving mechanism, controllable by the AF engine to move the lens along the focal sweep trajectory;

wherein the ISP applies a filtering operation upon pixel data that is read out from pixels of the image sensor and generated during the exposure time to generate an output image;

wherein the AF engine determines at least one target region of interest (ROI) from a plurality of ROIs according to an user input selection; the AF engine determines an optimal lens position corresponding to each target ROI and computes the focal sweep trajectory according to an exposure sequence corresponding to each target ROI and the optimal lens position corresponding to each target ROI; the AF engine determines a first target ROI and a second target ROI according to the user input selection, and a first exposure sequence corresponding to the first target ROI is prior to a second exposure sequence corresponding to the second target ROI; the AF engine sets the focal sweep trajectory of the lens to have a start position that is close to a first optimal lens position corresponding to the first target ROI; and an end position that is close to the second optimal lens position corresponding to the second target ROI; and the AF engine sets the start position to correspond to a start time of the exposure time and the end position to correspond to an end time of the exposure time;

wherein first pixels of the image sensor corresponding to the first ROI are exposed before second pixels of the image sensor corresponding to the second ROI are exposed.

6. The image capturing device of claim 5, wherein the ISP further comprises a spatial filter and the spatial filter applies a spatial filtering operation upon the pixel data to generate the output image.

7. The image capturing device of claim 5, wherein the AF engines sets the focal sweep trajectory of the lens to have the start position corresponding to a far focus and the end position corresponding to a near focus; and sets the start position to correspond to the start time of the exposure time and the end position to correspond to the end time of the exposure time.

8. The image capturing device of claim 5, wherein with respect to each target ROI, the AF engine:

controls the lens moving mechanism to move the lens along a peak sharpness searching trajectory including a plurality of peak sharpness searching lens positions;

calculates sharpness values of the target ROI respectively corresponding to the peak sharpness searching lens positions;

determines a peak sharpness value from the calculated sharpness values; and determines a specific peak sharpness searching lens position which corresponds to the peak sharpness value as the optimal lens position.

* * * * *